Patented Aug. 14, 1945

2,382,916

UNITED STATES PATENT OFFICE 2,382,916

MANUFACTURE OF PYRROLE DERIVATIVES

Maurice Arthur Thorold Rogers, Blackley, Manchester, England, assignor to Imperial Chemical Industries Limited, a corporation of Great Britain No Drawing. Application September 3, 1942, Serial No. 457,230. In Great Britain December 17, 1941

3 Claims. (Cl. 260—313)

This invention relates to the manufacture of new pyrrole derivatives, and in particular it relates to the manufacture of 5-nitroso-2:4-diarylpyrroles.

According to the invention I provide a process for the manufacture of 5-nitroso-2:4-diarylpyrroles which comprises nitrosating a 2:4-diarylpyrrole.

The nitrosating may be effected in a number of ways. It may be effected conveniently by treatment of the 2:4-diarylpyrrole with nitrous acid or with a functional derivative thereof. Thus the 2:4-diarylpyrrole may conveniently be dissolved or suspended in a suitable liquid for example water or ethanol, and a mineral acid, for example hydrochloric acid may be then added; to this mixture an alkali metal salt of nitrous acid, for example sodium nitrite, may be added. Alternatively, there may be added to the acidified solution of the 2:4-diarylpyrrole an ester of nitrous acid, for example amyl nitrite. Or nitrosyl chloride may be added to the 2:4-diarylpyrrole dissolved in a suitable solvent. Or again the nitrosation may be brought about by treatment of the 2:4-diarylpyrrole with nitrosyl sulphuric acid such as may be obtained by dissolving sodium nitrite in cold concentrated sulphuric acid. The nitroso-compounds may be isolated as the free bases or in the form of the corresponding salts, for example, the hydrochlorides.

The 2:4-diarylpyrroles which are the starting materials used in the invention may be obtained by the process described in copending application Serial No. 457,229 of even date herewith, namely, by the dehydrogenation of 2:4-diaryl-pyrrolines and -pyrrolidines.

As examples of suitable 2:4-diarylpyrroles there may be mentioned, 2:4-diphenylpyrrole, 2-(p-methoxyphenyl)-4-phenylpyrrole, 2-phenyl-4-(p-methoxy-phenyl)pyrrole, 2-(m-hydroxyphenyl)-4-phenylpyrrole, 2-(o-chlorophenyl)-4-phenylpyrrole, 2-(p-acetylaminophenyl)-4-phenylpyrrole, 2-α-naphthyl-4-phenylpyrrole, 2-phenyl-4-β-naphthylpyrrole, 2:3:4-triphenylpyrrole, 3-benzoylamino-2:4-diphenylpyrrole, 3-acetylamino-2:4-diphenylpyrrole, 3-benzoylamino-2:4-di-p-tolylpyrrole and 3-acetoacetylamino-2:4-diphenylpyrrole. Also included are the sulphonic acids of the 2:4-diarylpyrroles, which may be made, for example by sulphonating the above compounds.

The nitroso compounds of this invention may be represented by the general formula

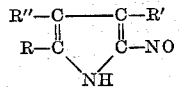

wherein R and R' represent aryl radicals of the benzene and naphthalene series, while R'' designates hydrogen, aryl or acylamino; however, in view of the double-bonds, it must be borne in mind that this formula is but one of several tautomeric configurations possible.

The invention is illustrated, but not limited, by the following examples in which the parts are by weight.

Example 1

5.0 parts of 2:4-diphenylpyrrole and 150 parts of alcohol are heated until the pyrrole is dissolved. The solution is then cooled with stirring, whereby much of the dissolved diphenylpyrrole is re-precipitated as a fine crystal paste, and 5 parts of concentrated hydrochloric acid (sp. gr. 1.18) are then added. Into this suspension there is gradually introduced a solution of 1.8 parts of sodium nitrite in 20 parts of water. The diphenylpyrrole is redissolved, and a dark yellow-brown solution is formed. The solution is filtered to remove any impurities, and 25 parts of concentrated hydrochloric acid (sp. gr. 1.18) are added, whereby the hydrochloride of 2:4-diphenyl-5-nitrosopyrrole is precipitated in the form of long brown needles, which are soluble in alcohol and in warm acetic acid, insoluble in benzene and acetone.

If it is desired to make the nitroso base instead of the hydrochloride, there is added in place of the 25 parts of hydrochloric acid, 25 parts of sodium acetate dissolved in 50 parts of alcohol; the colour of the solution changes from deep brown to a greenish-yellow, and when the solution is diluted with 500 parts of water there is obtained a green solid, which is filtered off, dried and recrystallised from ether. 5-nitroso-2:4-diphenylpyrrole is obtained in the form of green needles, M. P. 139–140° C.

Example 2

6 parts of the sodium salt of 2:4-diphenylpyrrole monosulphonic acid are suspended in a mixture of 500 parts of ethyl alcohol and 10 parts of concentrated hydrochloric acid and the mixture is boiled until a clear solution is obtained. The liquid is cooled, 50 parts of a 5% aqueous solution of sodium nitrite are then added slowly, and the brownish-yellow precipitate of 5-nitroso-2:4-diphenylpyrrole sulphonic acid which separates is collected by filtration and dried. It is soluble in aqueous alkali and in dilute aqueous ammonia.

Example 3

22 parts of 2:4-diphenylpyrrole are dissolved in 200 parts of concentrated sulphuric acid, and the solution is added slowly to a solution of 15 parts of sodium nitrite dissolved in 200 parts of concentrated sulphuric acid, the temperature being kept 5° C. by external cooling throughout the addition. The mixture is stirred during 1 hour below 5° C., and the solution is then poured on to 1000 parts of crushed ice. There is thus formed an orange-yellow precipitate, which consists of the sulphuric acid salt of 5-nitroso-2:4-diphenylpyrrole. The precipitate is collected by filtration and dried at 50° C.

In place of the 2:4-diphenylpyrrole there may be used 2-phenyl-4-(o-chlorophenyl)-pyrrole.

*Example 4*

22 parts of 2:4-diphenylpyrrole are suspended in 1000 parts of toluene, and a stream of nitrosyl chloride is passed into the suspension until no more of the gas is absorbed. There is formed an orange precipitate of 5-nitroso-2:4-diphenylpyrrole hydrochloride which is collected by filtration and dried.

*Example 5*

23 parts of 2-phenyl-4-(p-methoxyphenyl)-pyrrole are suspended in 500 parts of ethyl alcohol and 5 parts of concentrated hydrochloric acid are added to the suspension. There is then added to the stirred mixture during 30 minutes 12 parts of amyl nitrite. The pyrrole is thereby dissolved and a solution of deep purple colour is formed. To this solution there is added 50 parts of concentrated hydrochloric acid. There is thereby formed a precipitate of 5-nitroso-2-phenyl-4-(p-methoxyphenyl)-pyrrole hydrochloride. The precipitate is collected by filtration and dried. If desired, it may be purified by recrystallisation from ethyl alcohol whereby it is obtained in the form of purple prisms.

I claim:
1. 5-nitroso-2:4-diphenylpyrrole.
2. A compound of the group consisting of the members having the formula hereinbelow and their tautomers, said formula being

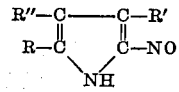

wherein R and R' represent aryl radicals having not more than 10 carbon atoms in their cyclic structure, while R'' represents a member of the group consisting of hydrogen, phenyl, and acylamino.

3. A compound of the group consisting of the members having the formula hereinbelow and their tautomers, said formula being

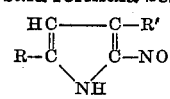

wherein R and R' represent benzenoid aryl radicals.

MAURICE ARTHUR THOROLD ROGERS.